US012563657B2

(12) United States Patent
Zhang et al.

(10) Patent No.: US 12,563,657 B2
(45) Date of Patent: Feb. 24, 2026

(54) HIGHLY INTEGRATED AND SMART CONTROL SYSTEM AND METHOD THEREOF

(71) Applicant: FOSHAN CARRO ELECTRICAL CO., LTD., Foshan (CN)

(72) Inventors: Jian-Sheng Zhang, Foshan (CN); Zi-Jian Chen, Foshan (CN)

(73) Assignee: Foshan Carro Electrical Co., Ltd., Foshan (CN)

( * ) Notice: Subject to any disclaimer, the term of this patent is extended or adjusted under 35 U.S.C. 154(b) by 464 days.

(21) Appl. No.: 18/166,731

(22) Filed: Feb. 9, 2023

(65) Prior Publication Data

US 2024/0160172 A1     May 16, 2024

(30) Foreign Application Priority Data

Nov. 16, 2022    (CN) .......................... 202211433635.1

(51) Int. Cl.
H05B 47/19          (2020.01)
F04D 25/08          (2006.01)

(52) U.S. Cl.
CPC ........... H05B 47/19 (2020.01); F04D 25/088 (2013.01); G05B 2219/2642 (2013.01)

(58) Field of Classification Search
CPC .................. H05B 47/19; F04D 25/088; G05B 2219/2642
See application file for complete search history.

(56) References Cited

U.S. PATENT DOCUMENTS

| | | | | |
|---|---|---|---|---|
| 2017/0134182 A1* | 5/2017 | Davis | .......................... | H04Q 9/00 |
| 2019/0186496 A1* | 6/2019 | Monteith | ............. | F24F 11/0001 |
| 2020/0227996 A1* | 7/2020 | Slivka | .................... | H05B 47/14 |
| 2020/0362869 A1* | 11/2020 | Shinar | .................... | F04D 25/08 |
| 2024/0393748 A1* | 11/2024 | Li | ........................... | H04W 4/90 |

FOREIGN PATENT DOCUMENTS

| | | | |
|---|---|---|---|
| CN | 211406360 U | * | 9/2020 |
| IN | 201611044263 A | * | 6/2018 |

* cited by examiner

*Primary Examiner* — Michael W Choi
(74) *Attorney, Agent, or Firm* — Rosenberg, Klein & Lee

(57) ABSTRACT

A highly integrated and smart control system includes a control module, a fan driver module, and a light driver module. The control module controls the fan driver module and/or the light driver module. The control module is a control chip packaged and integrated with a WiFi unit, a Bluetooth unit, and a central processing unit (CPU) as a package component. The CPU receives signals from the WiFi unit and the Bluetooth unit and accordingly controls the fan driver module and/or the light driver module. The present invention is able to decrease control chips needed and simplify circuitry needed for controlling a ceiling fan with or without a pendant light attached. The present invention enables smart controls over the ceiling fan with or without the pendant light by only using a single control chip.

19 Claims, 7 Drawing Sheets

HIGHLY INTEGRATED AND SMART CONTROL SYSTEM AND METHOD THEREOF

CROSS-REFERENCE TO RELATED APPLICATION(S)

This application claims the priority benefit of CN application serial No. 202211433635.1 filed on Nov. 16, 2022, the entirety of which is hereby incorporated by reference herein and made a part of the specification.

BACKGROUND OF THE INVENTION

1. Field of the Invention

The present invention relates to a control system and a control method for home appliances, more particularly to a highly integrated and smart control system and a control method thereof for the home appliances.

2. Description of the Related Art

A conventional ceiling fan has drastically improved human lives. In today's day and age, the conventional ceiling fan, with or without a pendant light, has become an integral part of modern home appliances.

A control system of the conventional ceiling fan, with or without the pendant light, often includes a WiFi/Bluetooth module and a control chip. The WiFi/Bluetooth module would receive wireless signals and relay the signals to the control chip, allowing the control chip to control a driver circuit for the conventional ceiling fan correspondingly. As such, the control chip would be able to control a fan module of the conventional ceiling fan, or control both a light module of the pendant light and the fan module of the conventional ceiling fan. However, the said control system requires complex circuitry, and therefore requires the control chip to be independently installed to the conventional ceiling fan. This makes the control system of the conventional ceiling fan expensive to manufacture and hard to conduct maintenance.

SUMMARY OF THE INVENTION

The present invention provides a highly integrated and smart control system and a method thereof.

The highly integrated and smart control system of the present invention requires less control chips than a control system of a conventional ceiling fan. By simplifying circuits, the present invention is able to improve the inconvenience of independently installing a control chip for a ceiling fan with a pendant light.

A control method for the highly integrated and smart control system of the present invention provides smart control to the ceiling fan, with or without the pendant light. The highly integrated smart control method simplifies steps for controlling the ceiling fan, and enhances user satisfaction towards the ceiling fan.

The highly integrated and smart control system includes a fan driver module, a light driver module, and a control module. The control module is electrically connected to the fan driver module and the light driver module, and the control module controls the fan driver module and/or the light driver module.

The control module is a control chip packaged and integrated with a WiFi unit, a Bluetooth unit, and a central processing unit as a package component. The central processing unit is electrically connected to the WiFi unit and the Bluetooth unit.

The central processing unit controls the fan driver module and/or the light driver module respectively according to a WiFi signal received by the WiFi unit and a Bluetooth signal received by the Bluetooth unit.

Furthermore, in an embodiment of the present invention, the control module further includes a 2.4G radio frequency unit and a memory unit. The 2.4G radio frequency unit and the memory unit are also packaged and integrated with the WiFi unit, the Bluetooth unit, and the central processing unit in the control chip. In other words, the control chip of the control module is packaged and integrated with the WiFi unit, the Bluetooth unit, the central processing unit in the control chip, the 2.4G radio frequency unit, and the memory unit. The 2.4G radio frequency unit and the memory unit are also electrically connected to the central processing unit.

The highly integrated and smart control system also includes an input module. The input module is communicatively connected to at least one of the WiFi unit, the Bluetooth unit, or the 2.4G radio frequency unit. The input module generates a wireless signal and outputs the wireless signal to at least one of the WiFi unit, the Bluetooth unit, or the 2.4G radio frequency unit. The central processing unit receives the wireless signal through the WiFi unit, the Bluetooth unit, or the 2.4G radio frequency unit, generates a working command according to the wireless signal, and outputs the working command to the fan driver module and/or the light driver module according to the wireless signal.

Furthermore, in another embodiment of the present invention, the input module includes at least one of a communication terminal, a Bluetooth terminal, a remote control terminal 43, or a 2.4G terminal.

The WiFi unit communicatively connects to the communication terminal through Internet, receives a WiFi wireless command signal outputted from the communication terminal, and outputs the WiFi wireless command signal to the central processing unit.

The Bluetooth unit communicatively connects to the Bluetooth terminal or the remote control terminal 43, receives a Bluetooth wireless command signal outputted from the Bluetooth terminal or a remote control wireless command signal outputted from the remote control terminal 43, and outputs the Bluetooth wireless command signal or the remote control wireless command signal to the central processing unit.

The 2.4G radio frequency unit communicatively connects to the 2.4G terminal, receives a 2.4G wireless command signal outputted from the 2.4G terminal or the remote control wireless command signal outputted from the remote control terminal 43, and outputs the 2.4G wireless command signal or the remote control wireless command signal to the central processing unit.

The central processing unit receives the WiFi wireless command signal, the Bluetooth wireless command signal, the remote control wireless command signal, or the 2.4G wireless command signal, and outputs the working command to the fan driver module and/or the light driver module according to the WiFi wireless command signal, the Bluetooth wireless command signal, the remote control wireless command signal, or the 2.4G wireless command signal.

In another embodiment, the WiFi unit, the Bluetooth unit, and the 2.4G radio frequency unit wirelessly communicate to other devices through a same antenna and through a same frequency band. The WiFi unit, the Bluetooth unit, and the 2.4G radio frequency unit also use time-division multiplex-ing (TMD) for transmitting and receiving the WiFi wireless command signal, the Bluetooth wireless command signal, and the 2.4G wireless command signal.

In another embodiment of the present invention, when the Bluetooth unit communicatively connects the Bluetooth terminal, the Bluetooth unit outputs a first connection signal to the central processing unit. The central processing unit receives the first connection signal and outputs a first connection working command to the fan driver module and/or the light driver module according to the first connec-tion signal. The fan driver module and/or the light driver module receives the first connection working command and functions according to the first connection working com-mand and a default setting.

When the Bluetooth unit communicatively disconnects the Bluetooth terminal, the Bluetooth unit outputs a second connection signal to the central processing unit. The central processing unit receives the second connection signal and outputs a second connection working command to the fan driver module and/or the light driver module according to the second connection signal. The fan driver module and/or the light driver module receives the second connection working command and functions according to the second connection working command and the default setting.

In another embodiment of the present invention, the communication terminal is a cloud server. When the WiFi unit receives local weather information sent from the com-munication terminal, the WiFi unit sends the local weather information to the central processing unit. When the central processing unit receives the local weather information, the central processing unit determines whether the local weather information is outside of a threshold range. If yes, the central processing unit generates an automatic working command and sends the automatic working command to the fan driver module and/or the light driver module. The fan driver module and/or the light driver module receives the auto-matic working command and functions according to the automatic working command.

In another embodiment of the present invention, the input module includes a sensor unit and a press control unit. The sensor unit and the press control unit generate the wireless signal and output the wireless signal to the central process-ing unit.

The highly integrated and smart control system also includes at least one of a display module, a sanitization module, a cleansing module, or a music module. The display module, the sanitization module, the cleansing module, or the music module is connected to the central processing unit.

The central processing unit outputs the working command to the display module, the sanitization module, the cleansing module, or the music module. The display module, the sanitization module, the cleansing module, or the music module receives the working command and functions according to the working command.

In another embodiment of the present invention, the highly integrated and smart control system of the present invention further includes a zero testing module and a silicon controlled rectifier module. The zero testing module and the silicon controlled rectifier module are electrically connected to the central processing unit.

The zero testing module further includes a first optocou-pler (U3), a first resistor (R20), a second resistor (R27), and a first diode (D3). The first optocoupler (U3) has a first pin, a second pin, a third pin, and a fourth pin. The third pin of the first optocoupler (U3) is electrically connected to ground, and the fourth pin of the first optocoupler (U3) is electrically connected to the central processing unit. A side of the first resistor (R20) is electrically connected to a fire line, and another side of the first resistor (R20) is electrically connected to the first pin of the first optocoupler (U3). The second resistor (R27) is electrically connected in parallel with the first resistor (R20). The first diode (D3) has an anode and a cathode. The anode of the first diode (D3) is electrically connected to the second pin of the first optocou-pler (U3), and the cathode of the first diode (D3) is electri-cally connected to a zero line.

The zero testing module determines whether a zero point is passed by an AC signal. When the zero testing module determines the zero point is passed by the AC signal, the zero testing module outputs a zero point testing signal to the central processing unit, allowing the central processing unit to control the fan driver module and/or the light driver module according to the zero point testing signal.

The silicon controlled rectifier module further includes a second optocoupler (MOC3021), a third resistor (R39), a fourth resistor (R42), and a bidirectional triode thyristor (TRIAC).

The second optocoupler (MOC3021) has a first pin, a second pin, a fourth pin, and a sixth pin. The second pin of the second optocoupler (MOC3021) is electrically con-nected to ground. A side of the third resistor (R39) is electrically connected to the fire line, and another side of the third resistor (R39) is electrically connected to the sixth pin of the second optocoupler (MOC3021). The fourth resistor (R42) is electrically connected between the first pin of the second optocoupler (MOC3021) and the central processing unit. The bidirectional triode thyristor (TRIAC) has a first pin, a second pin, and a third pin. The first pin of the bidirectional triode thyristor is electrically connected to the zero line, the second pin of the bidirectional triode thyristor is electrically connected to the fire line and the third resistor (R39), and the third pin of the bidirectional triode thyristor is electrically connected to the fourth pin of the second optocoupler (MOC3021).

In another embodiment of the present invention, the highly integrated and smart control system of the present invention further includes a hanging structure, a fan module, a light module, and a power module.

The hanging structure is connected to a ceiling and hanging from the ceiling. The fan module is connected to the hanging structure, hanging from the ceiling via the hanging structure, and electrically connecting the fan driver module. The light module is connected to the hanging structure, hanging from the ceiling via the hanging structure, and electrically connecting the light driver module. The power module is electrically connecting the control module, the fan driver module, and the light driver module for providing power. The power module takes in AC electricity, and the power module is able to output either AC electricity or DC electricity to the fan driver module or the light driver module. The fan driver module and/or the light driver module receives the working command and functions according to the working command. The working command is a switch-on command or a switch-off command.

A control method for the highly integrated and smart control system is executed by the central processing unit. The control method includes the following step:

receiving the wireless signal, generating the working command according to the wireless signal, and outputting the working command to the fan driver module and/or the light driver module for controlling the fan driver module and/or the light driver module.

In an embodiment of the present invention, the central processing unit receives the wireless signal generated and outputted by the input module. The wireless signal is at least one of a WiFi wireless command signal, a Bluetooth wireless command signal, a remote control wireless command signal, or a 2.4G wireless command signal.

In another embodiment of the present invention, the control method includes the following steps:

receiving a first connection signal from the Bluetooth unit when the Bluetooth unit is being connected with a Bluetooth terminal, and outputting a first connection working command to the fan driver module and/or the light driver module according to the first connection signal;

receiving a second connection signal from the Bluetooth unit when the Bluetooth unit is being disconnected from the Bluetooth terminal, and outputting a second connection working command to the fan driver module and/or the light driver module according to the second connection signal.

In another embodiment of the present invention, the control method includes the following steps:

receiving local weather information from the WiFi unit; wherein the WiFi unit obtains the local weather information from a communication terminal;

determining whether the local weather information is outside of a threshold range;

if yes, generating an automatic working command and sending the automatic working command to the fan driver module and/or the light driver module.

In another embodiment of the present invention, the control method includes the following steps:

receiving wireless command signals generated and sent from a sensor unit and a press control unit, generating the working commands according to the wireless command signals, and sending the working commands to the display module, the sanitization module, the cleansing module, or the music module for controlling the display module, the sanitization module, the cleansing module, or the music module.

In comparison to prior art, the present invention has the following advantage. Since the present invention communicates with other devices through the control module, the present invention is able to receive and transmit radio frequency signals without needing to install additional chips or a wireless module. At the same time, the control module functions like a central processing unit, hence controlling the fan driver module and light driver module. As such, the present invention is able to decrease control chips required for controlling a ceiling fan with or without a pendant light, and in general simplifies an overall circuitry required for controlling the ceiling fan with or without the pendant light.

DETAILED DESCRIPTION OF THE INVENTION

Figure 1:
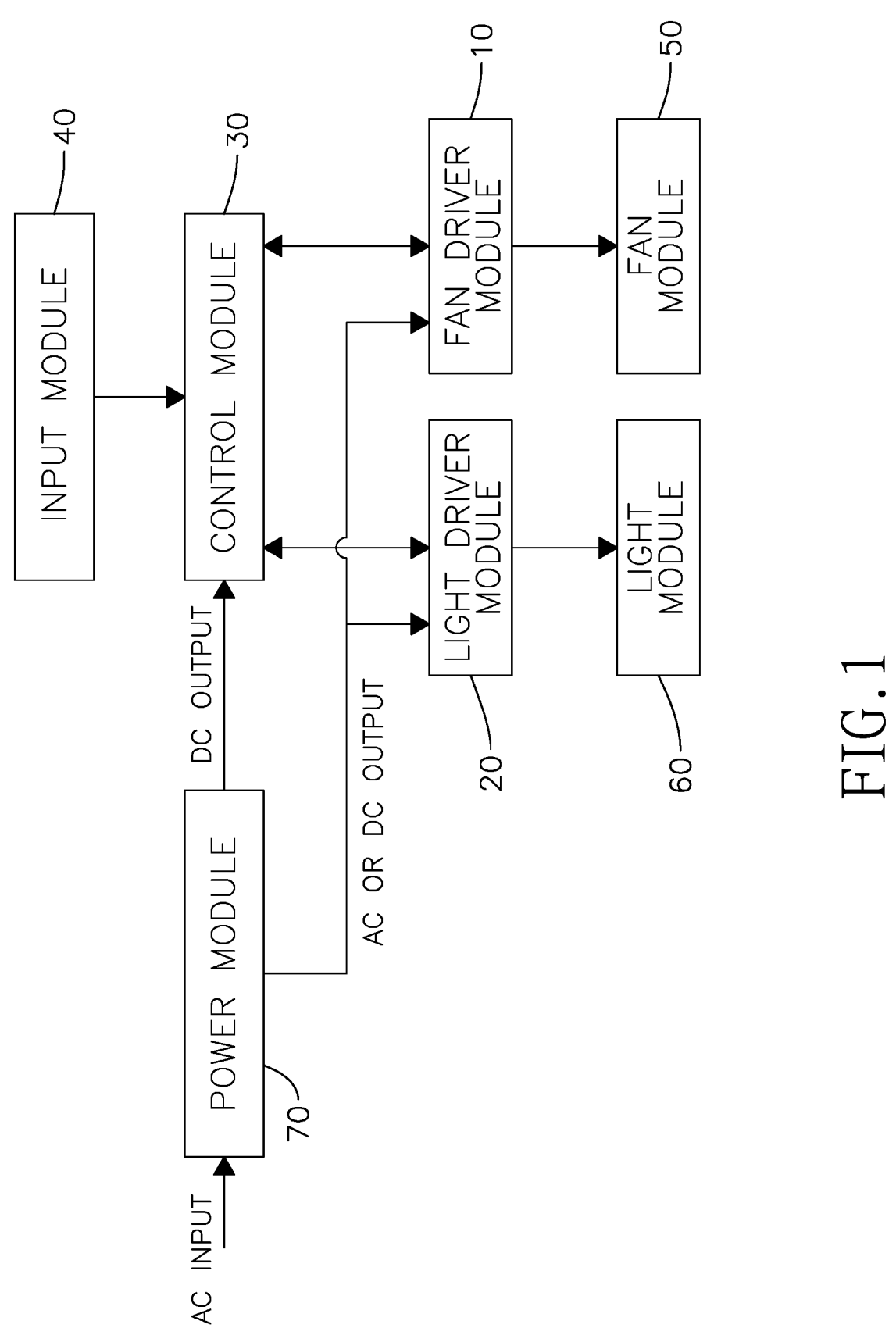
FIG. 1 is a block diagram of an embodiment of a highly integrated and smart control system of the present invention.
Figure 2:
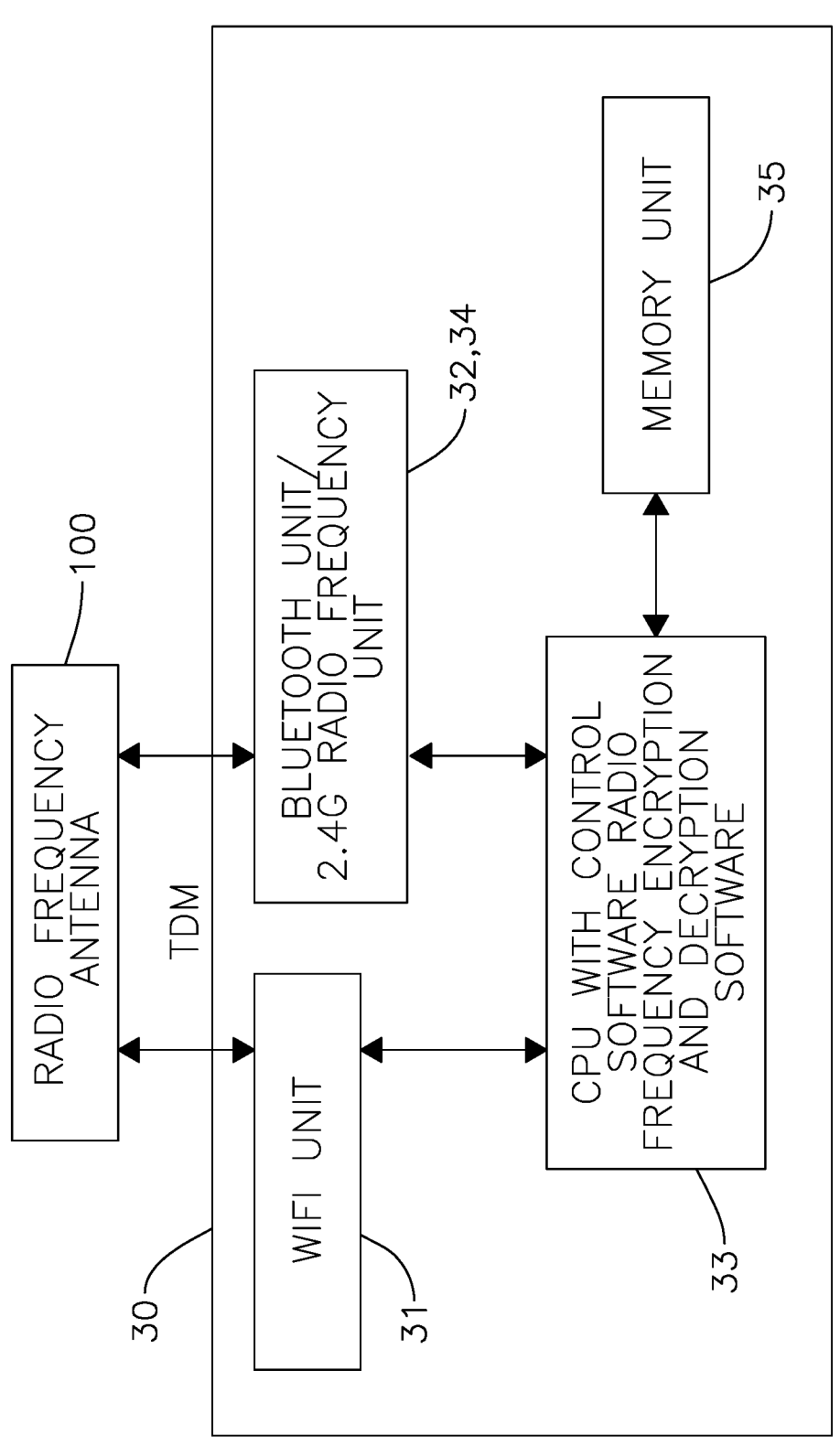
FIG. 2 is a block diagram of an embodiment of a control module of the highly integrated and smart control system of the present invention.
Figure 3:
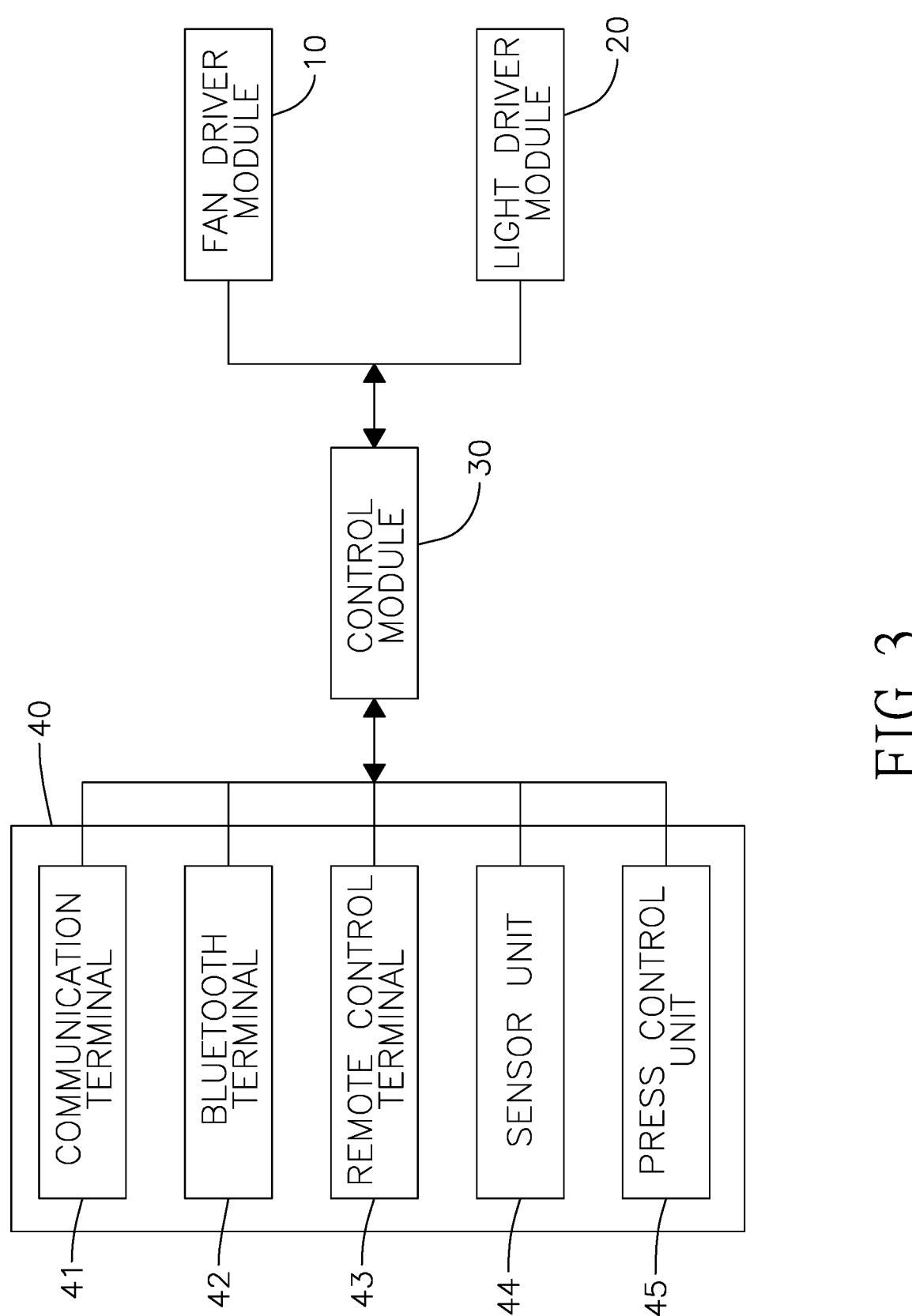
FIG. 3 is another block diagram of an embodiment of the highly integrated and smart control system of the present invention.
Figure 4:
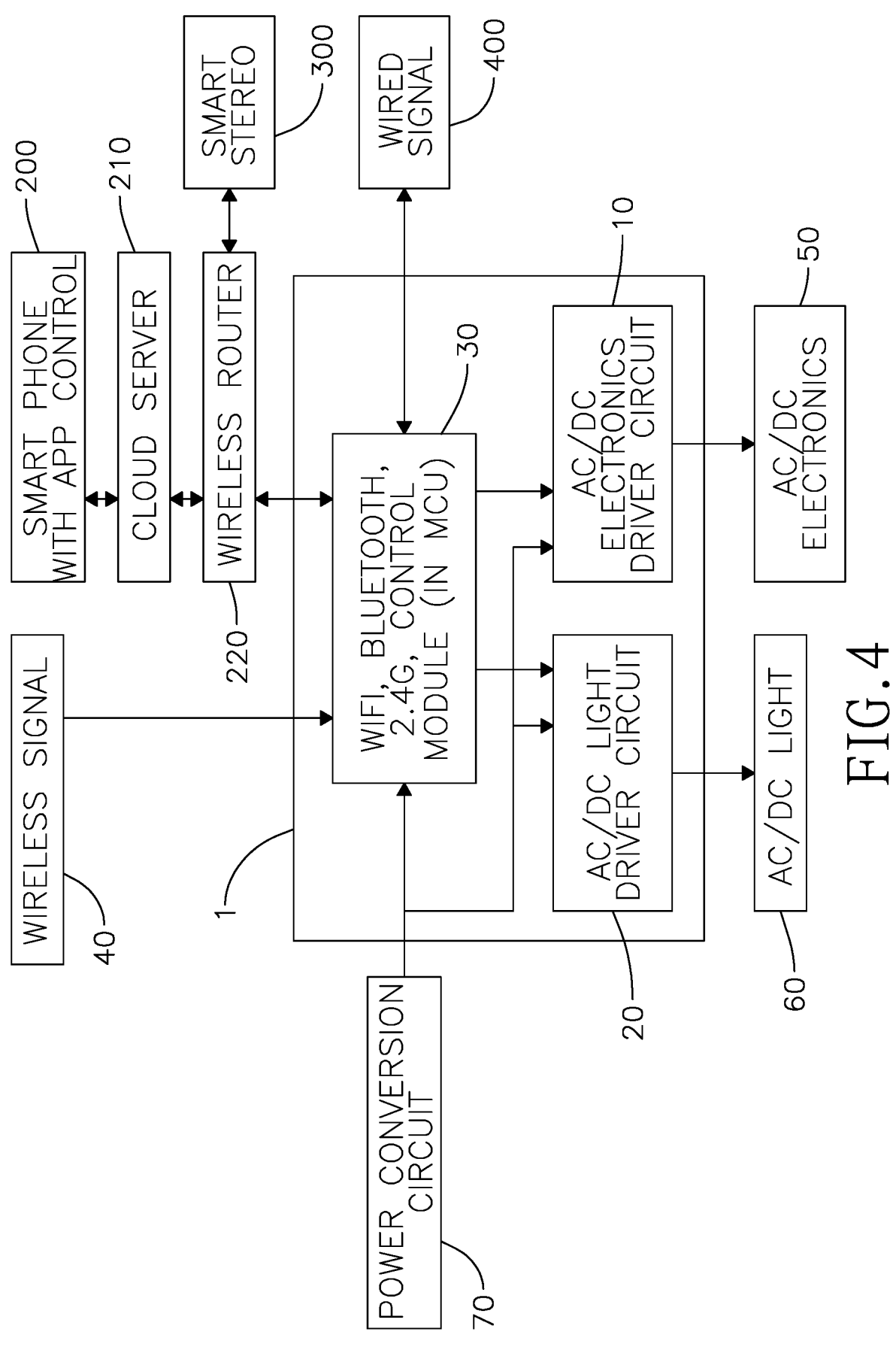
FIG. 4 is a perspective view showing how an embodiment of the highly integrated and smart control system of the present invention functions.

With reference to FIGS. 1 to 4, a highly integrated and smart control system 1 of the present invention includes a fan driver module 10, a light driver module 20, and a control module 30.

The control module 30 is electrically connected to the fan driver module 10 and the light driver module 20, and the control module 30 controls the fan driver module 10 and/or the light driver module 20.

The control module 30 is a control chip packaged and integrated with a WiFi (Wireless Fidelity) unit 31, a Bluetooth unit 32, and a central processing unit (CPU) 33. The CPU 33 is electrically connected to the WiFi unit 31 and the Bluetooth unit 32.

The CPU 33 controls the fan driver module 10 and/or the light driver module 20 according to a WiFi signal received by the WiFi unit 31 and a Bluetooth signal received by the Bluetooth unit 32. The WiFi signal and the Bluetooth signals are both radio frequency (RF) signals.

The present invention differs from having to use a conventional WiFi/Bluetooth module and a conventional control chip, because in order for the conventional control chip to control a light driver circuit and a fan driver circuit, a Bluetooth communication module, a 2.4G communication module, a light driver module, and a fan driver module all require individual chips to function. Since the present invention communicates with other devices through the control module 30 using wireless time-division multiplexing (TMD), the present invention is able to receive and transmit radio frequency signals without needing to install additional chips or a wireless module. At the same time, the control module 30 functions like a central processing unit, hence the control module 30 is able to control the fan driver module 10 and light driver module 20. As such, the highly integrated and smart control system 1 of the present invention is able to decrease control chips required for controlling a ceiling fan with or without a pendant light, and in general simplifies an overall circuitry required for controlling the ceiling fan with or without the pendant light. With the overall circuitry simplified, the present invention also is able to increase manufacturing yield, decrease manufacturing cost, and decrease maintenance cost for the highly integrated and smart control system 1.

Furthermore, in an embodiment of the present invention, the control module 30 further includes a 2.4G radio frequency unit 34 and a memory unit 35. The 2.4G radio frequency unit 34 and the memory unit 35 are also packaged and integrated with the WiFi unit 31, the Bluetooth unit 32, and the CPU 33 in the control chip. In other words, the control chip of the control module 30 is packaged and integrated with the WiFi unit 31, the Bluetooth unit 32, the CPU 33 in the control chip, the 2.4G radio frequency unit 34, and the memory unit 35. The 2.4G radio frequency unit 34 and the memory unit 35 are also electrically connected to CPU 33. In practice, a microcontroller unit (MCU) of the conventional WiFi/Bluetooth module is deeply developed into a system having capabilities of encrypting and transmitting 2.4G radio frequency signals as well as receiving and decrypting 2.4G radio frequency signals for home appliances. This is the reason that the present invention only requires one microprocessor to function.

The highly integrated and smart control system 1 also includes an input module 40. The input module 40 is communicatively connected to at least one of the WiFi unit 31, the Bluetooth unit 32, or the 2.4G radio frequency unit 34. The input module 40 generates a wireless signal and outputs the wireless signal to at least one of the WiFi unit 31, the Bluetooth unit 32, or the 2.4G radio frequency unit 34. The CPU 33 receives the wireless signal through the WiFi unit 31, the Bluetooth unit 32, or the 2.4G radio frequency unit 34, generates a working command according to the wireless signal, and outputs the working command to the fan driver module 10 and/or the light driver module 20 according to the wireless signal.

Furthermore, the WiFi unit 31, the Bluetooth unit 32, and the 2.4G radio frequency unit 34 are indirectly connected to the memory unit 35. The control module 30 bidirectionally communicates with the input module 40 through the WiFi unit 31, the Bluetooth unit 32, and the 2.4G radio frequency unit 34.

Furthermore, in another embodiment of the present invention, the input module 40 includes at least one terminal from a communication terminal 41, a Bluetooth terminal 42, a remote control terminal 43, or a 2.4G terminal.

The WiFi unit 31 is communicatively connected to the communication terminal 41 through Internet. The WiFi unit 31 receives a WiFi wireless command signal generated and outputted from the communication terminal 41, and outputs the WiFi wireless command signal to the CPU 33.

The Bluetooth unit 32 is communicatively connected to the Bluetooth terminal 42 or the remote control terminal 43. The Bluetooth unit 32 receives a Bluetooth wireless command signal generated and outputted from the Bluetooth terminal 42 or a remote control wireless command signal generated and outputted from the remote control terminal 43, and outputs the Bluetooth wireless command signal or the remote control wireless command signal to the CPU 33.

The 2.4G radio frequency unit 34 is communicatively connected to the 2.4G terminal. The 2.4G radio frequency unit 34 receives a 2.4G wireless command signal generated and outputted from the 2.4G terminal or the remote control wireless command signal outputted from the remote control terminal 43, and outputs the 2.4G wireless command signal or the remote control wireless command signal to the CPU 33.

The WiFi unit 31, the Bluetooth unit 32, and the 2.4G radio frequency unit 34 wirelessly communicate to other devices, for example the communication terminal 41, through a same antenna 100 and through a same frequency band. The WiFi unit 31, the Bluetooth unit 32, and the 2.4G radio frequency unit 34 use TMD for transmitting and receiving the WiFi wireless command signal, the Bluetooth wireless command signal, and the 2.4G wireless command signal.

The CPU 33 receives the WiFi wireless command signal, the Bluetooth wireless command signal, the remote control wireless command signal, or the 2.4G wireless command signal. The CPU 33 outputs the working command to the fan driver module 10 and/or the light driver module 20 according to the WiFi wireless command signal, the Bluetooth wireless command signal, the remote control wireless command signal, or the 2.4G wireless command signal.

As the control module 30 is packaged and integrated with the WiFi unit 31, the Bluetooth unit 32, the CPU 33, the 2.4G radio frequency unit 34, and the memory unit 35. The control module 30 is able to communicate with the communication terminal 41, the Bluetooth terminal 42, the remote control terminal 43, or the 2.4G terminal through the WiFi unit 31, the Bluetooth unit 32, and the 2.4G radio frequency unit 34. As such, the present invention is able to achieve four functionalities of wirelessly communicating via TMD with the communication terminal 41, the Bluetooth terminal 42, the remote control terminal 43, and the 2.4G terminal. Without needing to install additional chips or a wireless module, the present invention is able to receive and transmit three types of radio frequency signals. The CPU 33 receives the radio frequency signals, and accordingly controls the fan driver module 10 and/or the light driver module 20 in order to further control the ceiling fan with or without the pendant light. The control module 30 wirelessly communicates to other devices through the same antenna and through the same frequency band for transmitting and receiving WiFi, Bluetooth, or 2.4G radio frequency signals via TMD. In practice, the Bluetooth unit 32 and the 2.4G radio frequency unit 34 are in fact a same unit. The said same unit uses two different types of codex used for facilitating software means of TMD communication. The radio frequency signals transmit through a RF circuit, without needing to use a Micro-USB circuit and socket. Since the control module 30 is able to both receive the radio frequency signals and control the fan driver module 10 and the light driver module 20, the control module 30 is essentially a MCU with the said four functionalities combined into a single module.

Furthermore, as the WiFi unit 31 connects and communicates with Internet, the WiFi unit 31 is able to connect to the communication terminal 41 through the Internet. The communication terminal 41 is a laptop, a tablet computer, or a smart phone 200. The smart phone 200 is able to communicatively connect to the control module 30 by using WiFi to connect to a cloud server 210, then from the cloud server 210 connect to a wireless router (Access Point; AP) 220, and the wireless router 220 to the control module 30. Furthermore, through connecting to the control module 30 of the present invention, the smart phone 200 is able to communicatively connect to a public network through the wireless router 220, and further connect to multiple devices for controlling these devices. Such communication is facilitated and controlled by an application (APP) of the smart phone 200. As the Bluetooth unit 32 connects and communicates with a Bluetooth device and/or a remote device, the Bluetooth unit 32 connects and communicates with the smart phone 200 or a device such as a smart stereo 300 with Bluetooth capabilities. The 2.4G radio frequency unit 34 connects and communicates with 2.4G radio frequency signals for a one-to-one information exchange. The remote control terminal 43 directly transmits Bluetooth or 2.4G radio frequency signal to the Bluetooth unit 32. When the CPU 33 subsequently receives the corresponding signals from the Bluetooth unit 32, the CPU 33 decrypts the corresponding signals, and then correspondingly controls the fan driver module 10 and/or the light driver module 20. In an embodiment, the control module 30 is electrically and communicatively connected to a controller via hard wires 400. The control module 30 receives hard wire signals via the hard wires 400, and subsequently sends the working commands to control the fan driver module 10 and/or the light driver module 20 according to the hard wire signals.

In another embodiment of the present invention, when the Bluetooth unit 32 communicatively connects the Bluetooth terminal 42, the Bluetooth unit 32 outputs a first connection signal to the CPU 33. The CPU 33 receives the first connection signal and outputs a first connection working command to the fan driver module 10 and/or the light driver module 20 according to the first connection signal. The fan driver module 10 and/or the light driver module 20 receives the first connection working command and functions according to the first connection working command and a default setting.

When the Bluetooth unit 32 communicatively disconnects the Bluetooth terminal 42, the Bluetooth unit 32 outputs a second connection signal to the CPU 33. The CPU 33 receives the second connection signal and outputs a second connection working command to the fan driver module 10 and/or the light driver module 20 according to the second connection signal. The fan driver module 10 and/or the light driver module 20 receives the second connection working command and functions according to the second connection working command and the default setting.

In another embodiment of the present invention, the communication terminal 41 is the cloud server 210. When the WiFi unit 31 receives local weather information sent from the communication terminal 41, the WiFi unit 31 sends the local weather information to the CPU 33. When the CPU 33 receives the local weather information, the CPU 33 determines whether the local weather information is outside of a threshold range. If yes, the CPU 33 generates an automatic working command and sends the automatic working command to the fan driver module 10 and/or the light driver module 20. The fan driver module 10 and/or the light driver module 20 receives the automatic working command and functions according to the automatic working command.

In an embodiment, the local weather information received through the communication terminal 41 includes temperature information and moisture information. The user is able to configure the threshold range in regards to the temperature information and the moisture information, and further configures corresponding actions, or rather the automatic working command generated, to control the fan driver module 10 and/or the light driver module 20.

In practice, the Bluetooth unit 32 and the Bluetooth terminal 42 connect through the Bluetooth communications protocol. When the Bluetooth terminal 42 enters into a connection range of the Bluetooth unit 32, the Bluetooth unit 32 and the Bluetooth terminal 42 communicatively connect, and the Bluetooth unit 32 sends out the first connection signal towards the CPU 33. When the Bluetooth terminal 42 leaves the connection range of the Bluetooth unit 32, the Bluetooth unit 32 and the Bluetooth terminal 42 communicatively disconnect, and the Bluetooth unit 32 sends out the second connection signal towards the CPU 33.

In another embodiment of the present invention, the input module 40 includes a sensor unit 44 and a press control unit 45. The sensor unit 44 and the press control unit 45 generate the wireless signal and output the wireless signal to the CPU 33.

In an embodiment, the press control unit 45 is able to receive the wireless signal. The press control unit 45 is a control board with buttons. The user is able to use the control board and thus interact with the control module 30 of the present invention.

The highly integrated and smart control system 1 also includes at least one of a display module, a sanitization module, a cleansing module, or a music module. The display module, the sanitization module, the cleansing module, or the music module is electrically connected to the CPU 33.

The CPU 33 outputs the working command to the display module, the sanitization module, the cleansing module, or the music module. The display module, the sanitization module, the cleansing module, or the music module receives the working command and functions according to the working command.

In an embodiment, the display module is a monitor for displaying commands directed by the control module 30. The sanitization module is a sanitization device such as a ultra-violet light device or a sprayer capable of executing sterilization commands directed by the control module 30. The cleansing module is an air ionizer or an ozone generator capable of executing air purification commands directed by the control module 30. The music module is a music player capable of executing music commands directed by the control module 30 to play music or to pause playing music.

Furthermore, the sensor unit 44 includes at least one of a temperature sensor, a moisture sensor, a sound detector, a light detector, a microwave sensor, and an infrared sensor.

In an embodiment of the present invention, the sensor unit 44 includes the temperature sensor. The temperature sensor is mounted within or outside a hanger protected shell of a hanging structure of the ceiling fan with or without the pendant light. In another embodiment, the temperature sensor is mounted within or outside a fan protected shell of the ceiling fan with or without the pendant light. The temperature sensor detects ambient temperature and sends out wireless command signals towards the CPU 33. As previously mentioned, the user is able to configure the threshold range in regards to temperature. When such temperature threshold range is crossed, the CPU 33 generates the automatic working command to switch on or switch off the fan driver module 10 and/or the light driver module 20, or to speed up and slow down the fan driver module 10. In practice, when the ambient temperature reaches the temperature threshold of 30 degrees Celsius, the ceiling fan of the pendant light would then automatically speed up to a maximum speed range.

In another embodiment of the present invention, the sensor unit 44 includes the moisture sensor. The moisture sensor is mounted outside of the hanger protected shell or outside of the fan protected shell. The moisture sensor detects ambient moisture and sends out wireless command signals towards the CPU 33. The user is able to configure the threshold range in regards to moisture. When such moisture threshold range is crossed, the CPU 33 generates the automatic working command to switch on or switch off the fan driver module 10 and/or the light driver module 20, or to speed up and slow down the fan driver module 10. In practice, when the ambient moisture reaches the moisture threshold of 51% RH, the ceiling fan of the pendant light would then automatically speed up to a maximum speed range.

In another embodiment of the present invention, the sensor unit 44 includes the sound detector and the light detector. The sound detector and the light detector are mounted outside of the hanger protected shell or outside of the fan protected shell. The sound detector detects ambient sound and sends out wireless command signals towards the CPU 33. The light detector detects ambient light and sends out wireless command signals towards the CPU 33. The user is able to configure that when the sound detector detects ambient sound when the light detector detect darkness, as in the case of detecting a sound of footsteps at night, the sensor unit 44 would then automatically switch on the ceiling fan.

In another embodiment of the present invention, the sensor unit 44 includes the microwave sensor. The microwave sensor is mounted outside of the hanger protected shell or outside of the fan protected shell. The microwave sensor detects human or object movements and sends out wireless command signals towards the CPU 33. The wireless command signals include a switch on signal. For example, when a human approaches the microwave sensor, the CPU 33 switches on the ceiling fan, and when the human approaches the microwave sensor in the darkness at night, the CPU 33 additionally switches on the pendant light.

In another embodiment of the present invention, the sensor unit 44 includes the infrared sensor. The infrared sensor is mounted outside of the hanger protected shell or outside of the fan protected shell. The infrared sensor detects whether human is present within a sensing radius and sends out wireless command signals towards the CPU 33. The wireless command signals include a switch on signal. For example, when a human approaches the infrared sensor, the CPU 33 switches on the ceiling fan with or without the pendant light, and when the human approaches the infrared sensor in the darkness at night, the CPU 33 additionally switches on the pendant light.

Furthermore, the user is still able to physically switch on and switch off a fan module 50 and/or a light module 60 of the ceiling fan with or without the pendant light via a physical switch. The light module 60 corresponds to the pendant light, and the fan module 50 corresponds to the ceiling fan.

Figure 5:
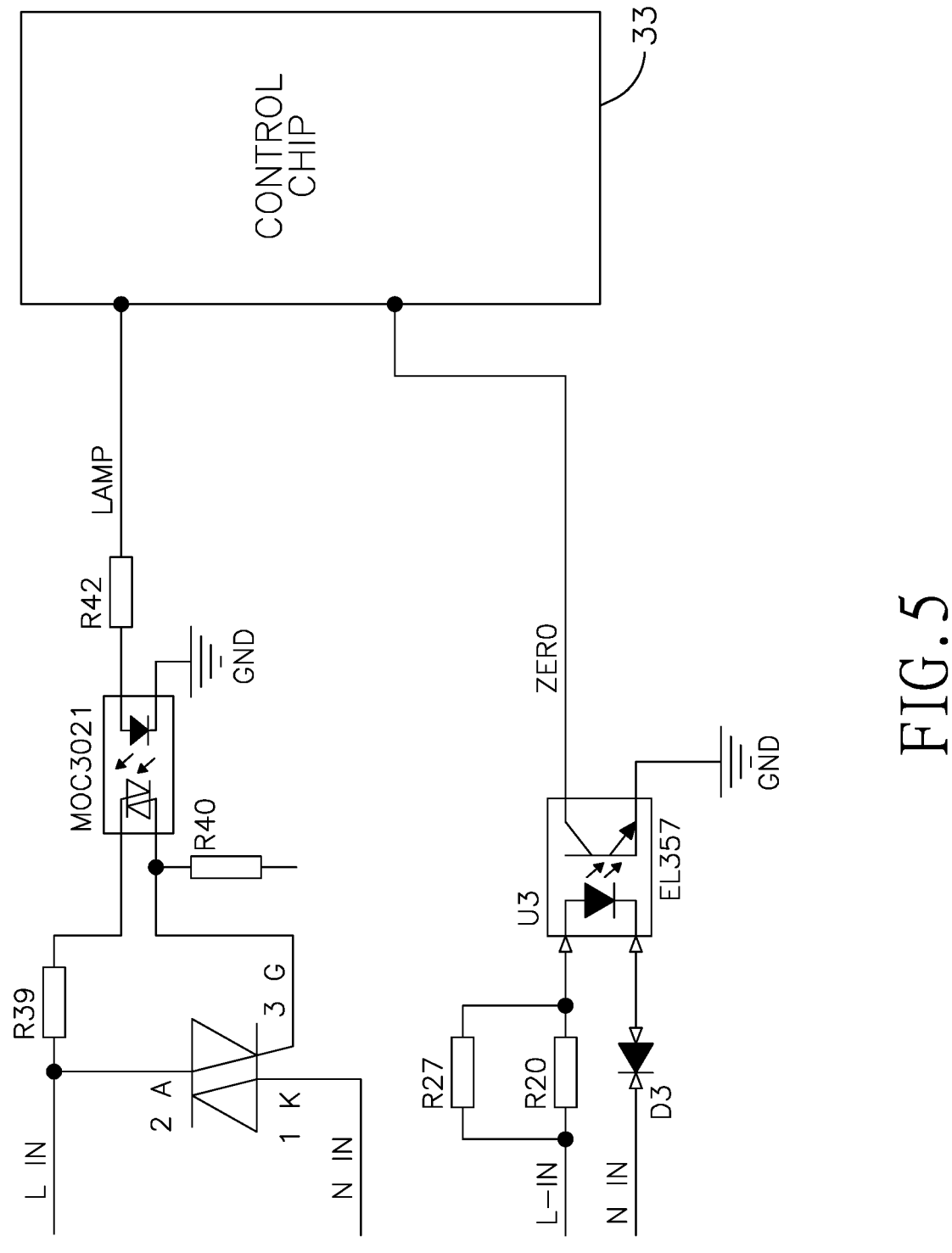
FIG. 5 is a perspective view of an embodiment of a zero testing module electrically connected to a silicon controlled rectifier module of the highly integrated and smart control system of the present invention.

With reference to FIG. 5, in another embodiment of the present invention, the highly integrated and smart control system 1 of the present invention further includes a zero testing module and a silicon controlled rectifier module. The zero testing module and the silicon controlled rectifier module are electrically connected to a control chip in the CPU 33.

The zero testing module includes a first optocoupler (U3), a first resistor (R20), a second resistor (R27), and a first diode (D3).

The first optocoupler (U3) has a first pin, a second pin, a third pin, and a fourth pin. The third pin of the first optocoupler (U3) is electrically connected to ground GND, and the fourth pin of the first optocoupler (U3) is electrically connected to the CPU 33. A side of the first resistor (R20) is electrically connected to a fire line, and another side of the first resistor (R20) is electrically connected to the first pin of the first optocoupler (U3). The second resistor (R27) is electrically connected in parallel with the first resistor (R20). The first diode (D3) has an anode and a cathode. The anode of the first diode (D3) is electrically connected to the second pin of the first optocoupler (U3), and the cathode of the first diode (D3) is electrically connected to a zero line.

The zero testing module determines whether a zero point is passed by an AC signal. When the zero testing module determines the zero point is passed by the AC signal, the zero testing module outputs a zero point testing signal to the CPU 33, allowing the central processing unit to control the fan driver module 10 and/or the light driver module 20 according to the zero point testing signal. In the embodiment, the zero point is also conventionally known as a zero cross point for conducting zero crossing control to a circuit with the AC signal. The zero point is when the AC signal is crossing zero volt, such as at the beginning or at the middle of a sinusoidal wave of the AC signal.

More specifically, the first optocoupler (U3) is a chip of model EL357. When the chip works, the first optocoupler (U3) is conducting, and the AC signal passes through the first optocoupler (U3). The CPU 33 detects a voltage on the fourth pin of the first optocoupler (U3), which is also output voltage of a collector (C) of a transistor within the first optocoupler (U3). The CPU 33 determines whether the voltage on the fourth pin of the first optocoupler (U3) is around the zero point. When the voltage on the fourth pin of the first optocoupler (U3) is around the zero point, a voltage value of the AC signal is less than 0.7 volt (V), and the first optocoupler (U3) stops conducting. When the voltage on the fourth pin of the first optocoupler (U3) is at least 5 V, then the CPU 33 determines the voltage is no longer around the zero point and has passed the zero point. By determining whether the voltage value of the AC signal has passed the zero point, the control module 30 of the present invention is able to decide whether to change brightness and to switch on/off the pendant light.

The silicon controlled rectifier module further includes a second optocoupler, a third resistor (R39), a fourth resistor (R42), and a bidirectional triode thyristor (TRIAC).

The second optocoupler has a first pin, a second pin, a fourth pin, and a sixth pin. The second pin of the second optocoupler is electrically connected to the ground GND. A side of the third resistor (R39) is electrically connected to the fire line, and another side of the third resistor (R39) is electrically connected to the sixth pin of the second optocoupler. The fourth resistor (R42) is electrically connected between the first pin of the second optocoupler and the CPU 33. The bidirectional triode thyristor (TRIAC) has a first pin, a second pin, and a third pin. The first pin of the bidirectional triode thyristor is electrically connected to the zero line, the second pin of the bidirectional triode thyristor is electrically connected to the fire line and the third resistor (R39), and the third pin of the bidirectional triode thyristor is electrically connected to the fourth pin of the second optocoupler.

More specifically, the second optocoupler is a chip of model MOC3021. After the voltage has passed the zero point, the silicon controlled rectifier module is able to delay an output to the control module 30. For example, after the voltage has passed the zero point, and after a set amount of time, the bidirectional triode thyristor (TRIAC) starts conducting, and thus outputting the delayed and altered waveform of the AC signal.

In another embodiment of the present invention, the highly integrated and smart control system 1 of the present invention further includes the hanging structure, the fan module 50, the light module 60, and a power module 70.

The hanging structure is connected to a ceiling and hanging from the ceiling. The fan module 50 is connected to the hanging structure, hanging from the ceiling via the hanging structure, and electrically connecting the fan driver module 10. The light module 60 is connected to the hanging structure, hanging from the ceiling via the hanging structure, and electrically connecting the light driver module 20. The power module 70 is electrically connecting the control module 30, the fan driver module 10, and the light driver module 20 for providing power. The power module 70 takes in AC electricity, and the power module 70 is able to output either AC electricity or DC electricity to the fan driver module 10 or the light driver module 20. The fan driver module 10 and/or the light driver module 20 receives the working command and functions according to the working command. The working command is a switch-on command or a switch-off command.

Furthermore, the power module 70, the control module 30, the fan driver module 10, and the light driver module 20 are all independent and modular. This allows the power module 70, the control module 30, the fan driver module 10, and the light driver module 20 to be assembled freely, and structurally satisfies a demand of the user. For instance, the control module 30, the fan driver module 10, and the light driver module 20 are free to be installed within the hanger protected shell or within the fan protected shell.

The power module 70 delivers power to the fan driver module 10 and the light driver module 20 in the following four different possible ways:

(1) delivering DC power to the fan driver module 10 and the light driver module 20;

(2) delivering AC power to the fan driver module 10 and the light driver module 20;

(3) delivering DC power to the light driver module 20 and delivering AC power to the fan driver module 10;

(4) delivering AC power to the light driver module 20 and delivering DC power to the fan driver module 10.

The CPU 33 may electrically connect to both the fan driver module 10 and the light driver module 20 together, or the CPU 33 may electrically connect to both the fan driver module 10 and the light driver module 20 independently for independently controlling the fan driver module 10 and the light driver module 20. The light driver module 20 is a DC light driver circuit or an AC light driver circuit, and the light module 60 driven by the light driver module 20 includes a DC light or an AC light. Similarly, the fan driver module 10 is a DC fan driver circuit or an AC fan driver circuit, and the fan module 50 driven by the fan driver module 10 includes a DC motor or an AC motor.

As previously mentioned, the working command is a switch-on command or a switch-off command. In other words, a device is connected to the highly integrated and smart control system 1 of the present invention via Bluetooth of a smart phone 200, and the control module 30 subsequently receives a switch on light wireless command signal, a switch off light wireless command signal, a switch on fan wireless command signal, or a switch off fan wireless command signal. The control module 30 then accordingly switches on/off the fan driver module 10 and the light driver module 20, in order to further control switching on/off the fan module 50 and the light module 60.

A default response corresponding to the first connection signal and another default response corresponding to the second connection signal are configured by the user. The default response corresponding to the first connection signal, for example, is the switch on light wireless command signal or the switch on fan wireless command signal. As the Bluetooth terminal 42 enters the connection range of the Bluetooth unit 32, the fan driver module 10 and the fan module 50, and/or the light driver module 20 and the light module 60 start working. The default response corresponding to the second connection signal, for example, is the switch off light wireless command signal or the switch off fan wireless command signal. As the Bluetooth terminal 42 leaves the connection range of the Bluetooth unit 32, the fan driver module 10 and the fan module 50, and/or the light driver module 20 and the light module 60 stop working.

In practice, as the user enters home, the present invention satisfies the user's need for automatically switching on the ceiling fan with or without the pendant light. As the user with the smart phone 200 enters the connection range, the present invention automatically connects to a Bluetooth antenna of the smart phone 200, and thus subsequently switches on the fan driver module 10 and the fan module 50, and/or the light driver module 20 and the light module 60. The memory unit 35 stores information related to the Bluetooth enabled devices connected to the present invention in a record file, and the record file is used to more efficiently automatically connect to the corresponding Bluetooth enabled devices next time when connected. In other words, when the user with the smart phone 200 leaves the connection area, such as when the user leaves home, the Bluetooth unit 32 and the Bluetooth terminal 42 communicatively disconnect, and subsequently the present invention switches off the fan driver module 10 and the fan module 50. Of course, the user may also configure the default responses corresponding to the first and the second connection signals. In other words, the present invention may be configured to switch on/off both the ceiling fan and the pendant light, only the pendant light, or only the ceiling fan.

Also in practice, the temperature threshold range may also be configured by the user of the present invention. For example, the user sets the temperature threshold range as 20 degrees Celsius to 22 degrees Celsius, and therefore, when the ambient temperature drops below 20 degrees Celsius, the present invention switches off the fan; when the ambient temperature rises above 22 degrees Celsius, the present invention switches on the ceiling fan to rotate in a certain speed range. This customization allows the present invention to be smart and better satisfy the user's expectations.

The two radio frequency units (the WiFi unit 31 and the Bluetooth unit 32) are encrypted and decrypted by the CPU 33, and such WiFi and Bluetooth encryption/decryption software codex is stored in a dynamic-link library (DLL).

Figure 6A:
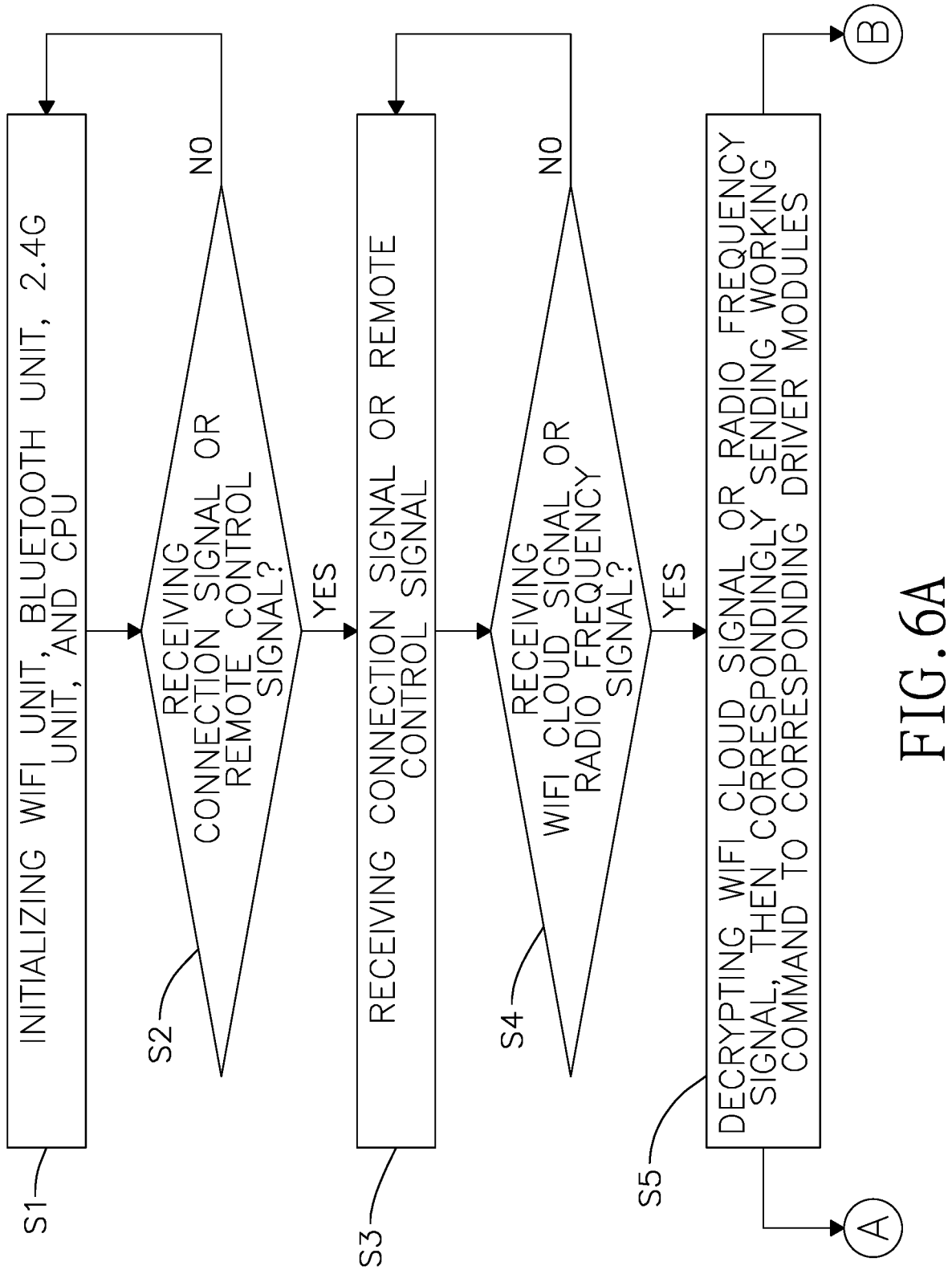
FIG. 6A is a flow chart of a control method for the highly integrated and smart control system of the present invention.
Figure 6B:
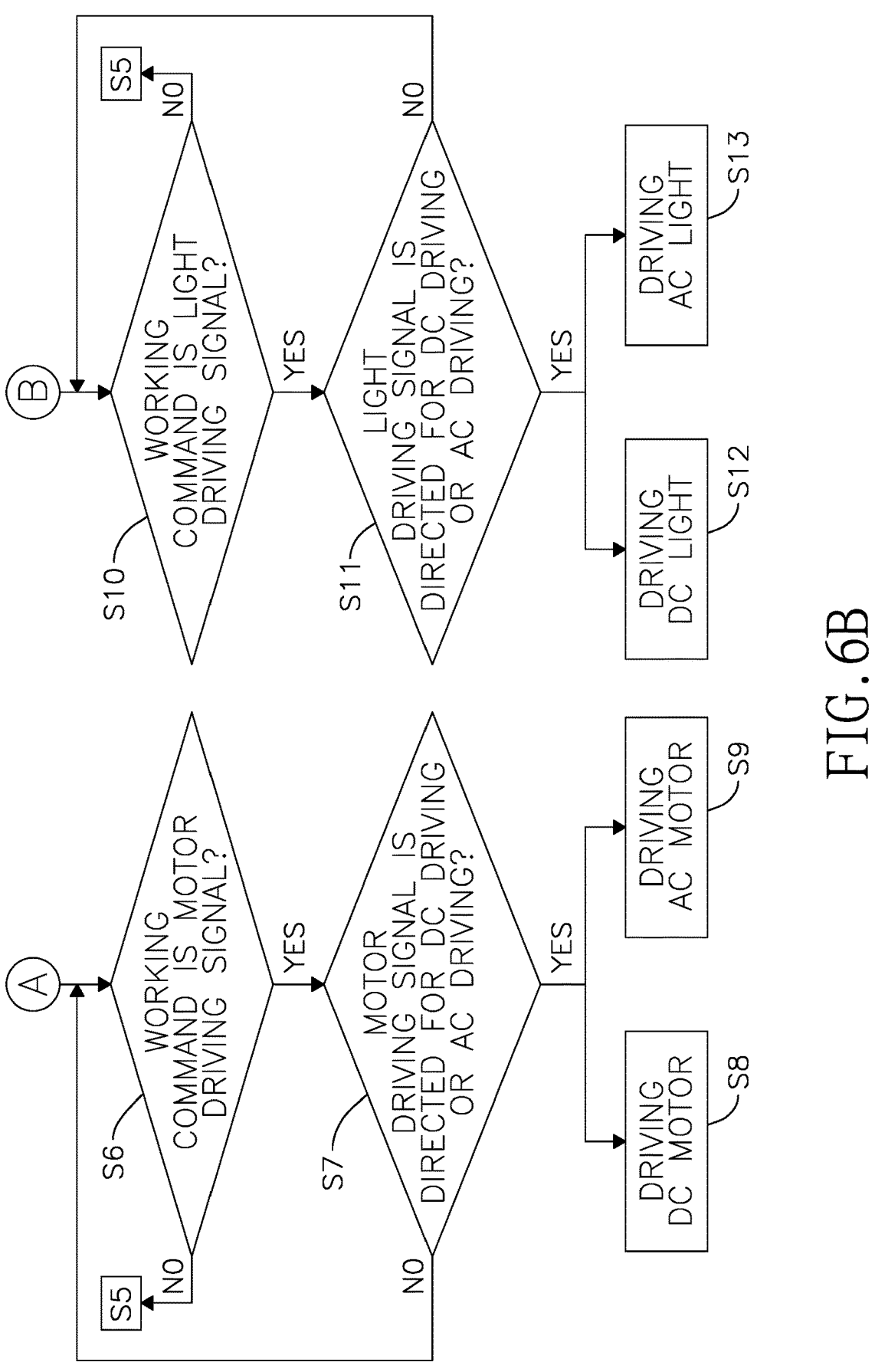
FIG. 6B is another flow chart of the control method for the highly integrated and smart control system of the present invention.

With reference to FIGS. 6A and 6B, a flow chart of control program used for the control module 30 of the present invention includes the following steps:

Step S1: initializing the WiFi unit 31, the Bluetooth unit 32, the 2.4G radio frequency unit 34, and the CPU 33.

Step S2: determining whether receiving a connection signal or a remote control signal. If no, then wait and execute step S1.

Step S3: if yes, then receiving the connection signal or the remote control signal.

Step S4: determining whether receiving a WiFi cloud signal (the WiFi wireless command signal) or a radio frequency signal (the Bluetooth wireless command signal and the remote control wireless command signal). If no, then wait and execute step S3.

Step S5: if yes, then decrypting the WiFi cloud signal or the radio frequency signal, and then correspondingly sending the working command to the corresponding driver modules.

Step S6: determining whether the working command is a motor driving signal. When the working command is not the motor driving signal, execute step S5.

Step S7: when the working command is the motor driving signal, determining whether the motor driving signal is directed for DC driving or AC driving. When the motor driving signal is not directed for DC driving or AC driving, execute step S6.

Step S8: when the motor driving signal is directed for DC driving, DC driving a DC motor.

Step S9: when the motor driving signal is directed for AC driving, AC driving an AC motor.

Step S10: determining whether the working command is a light driving signal. When the working command is not the light driving signal, execute step S5.

Step S11: when the working command is the light driving signal, determining whether the light driving signal is directed for DC driving or AC driving. When the light driving signal is not directed for DC driving or AC driving, execute step S10.

Step S12: when the light driving signal is directed for DC driving, generating a pulse-width modulation (PWM) driving signal for driving a DC light.

Step S13: when the light driving signal is directed for AC driving, generating a delayed and rectified signal by executing the zero point test for driving an AC light.

A control method for the highly integrated and smart control system 1 is executed by the CPU 33 in the control module 30. The control method includes the following steps:

receiving the wireless signal, generating the working command according to the wireless signal, and outputting the working command to the fan driver module 10 and/or the light driver module 20 for controlling the fan driver module 10 and/or the light driver module 20.

In an embodiment of the present invention, the CPU 33 receives the wireless signal which is generated and outputted by the input module 40. The wireless signal is at least one of a WiFi wireless command signal, a Bluetooth wireless command signal, a remote control wireless command signal, or a 2.4G wireless command signal.

Through receiving wireless signals from the WiFi unit 31 and the Bluetooth unit 32, the present invention is widely adapted to receive the WiFi wireless command signal, the Bluetooth wireless command signal, the remote control wireless command signal, and the 2.4G wireless command signal for satisfying the user's various needs of connecting different wireless communication options.

In another embodiment of the present invention, the control method includes the following steps:

receiving a first connection signal from the Bluetooth unit 32 when the Bluetooth unit 32 is being connected with a Bluetooth terminal 42, and outputting a first connection working command to the fan driver module 10 and/or the light driver module 20 according to the first connection signal;

receiving a second connection signal from the Bluetooth unit 32 when the Bluetooth unit 32 is being disconnected from the Bluetooth terminal 42, and outputting a second connection working command to the fan driver module 10 and/or the light driver module 20 according to the second connection signal.

In another embodiment of the present invention, the control method includes the following steps:

receiving local weather information from the WiFi unit 31; wherein the WiFi unit 31 obtains the local weather information from a communication terminal 41;

determining whether the local weather information is outside of a threshold range;

if yes, generating an automatic working command and sending the automatic working command to the fan driver module 10 and/or the light driver module 20.

In another embodiment of the present invention, the control method includes the following steps:

receiving wireless command signals generated and sent from a sensor unit 44 and a press control unit 45, generating the working commands according to the wireless command signals, and sending the working commands to the display module, the sanitization module, the cleansing module, or the music module for controlling the display module, the sanitization module, the cleansing module, or the music module.

By automatically acquiring the local weather information and adjusting the fan driver module 10 and/or the light driver module 20 accordingly, the present invention spares the user the inconvenience to manually switch on/off the ceiling fan with or without the pendant light according to local weather. The present invention can efficiently respond to weather changes, and control the ceiling fan with or without the pendant light according to the user's configuration. This way the present invention is able to improve user experience for customized control over the ceiling fan and the pendant light.

Furthermore, the sensor unit 44 of the present invention can further automatically detect ambient temperature, moist, sound, brightness, and human movements, and thus automatically generate the working command according to ambient changes in the environment. This further improves user experience for customized control over the ceiling fan and the pendant light. The present invention may further receive and transmit wireless command signals through the press control unit 45. The user may use the press control unit 45 to further customize response to the working commands for the display module, the sanitization module, the cleansing module, and the music module. These additional features further improve user experience for the present invention.

What is claimed is:

1. A highly integrated and smart control system, comprising:

a fan driver module;

a light driver module; and a control module, electrically connected to the fan driver module and the light driver module, and controlling the fan driver module and/or the light driver module;

wherein the control module is a control chip packaged and integrated with a WiFi unit, a Bluetooth unit, and a central processing unit, and the control module is thus a package component comprising the WiFi unit, the Bluetooth unit, and the central processing unit; wherein the central processing unit is electrically connected to the WiFi unit and the Bluetooth unit;

wherein the central processing unit controls the fan driver module and/or the light driver module according to a WiFi signal received by the WiFi unit and/or a Bluetooth signal received by the Bluetooth unit;

wherein the highly integrated and smart control system further comprises:

a zero testing module, electrically connected to the central processing unit;

wherein the zero testing module further comprises:

a first optocoupler (U3), having a first pin, a second pin, a third pin, and a fourth pin; wherein the third pin of the first optocoupler (U3) is electrically connected to ground, and the fourth pin of the first optocoupler (U3) is electrically connected to the central processing unit;

a first resistor (R20); wherein a side of the first resistor (R20) is electrically connected to a fire line, and another side of the first resistor (R20) is electrically connected to the first pin of the first optocoupler (U3);

a second resistor (R27), electrically connected in parallel with the first resistor (R20); and a first diode (D3), having an anode and a cathode; wherein the anode of the first diode (D3) is electrically connected to the second pin of the first optocoupler (U3), and the cathode of the first diode (D3) is electrically connected to a zero line;

wherein the zero testing module determines whether a zero point is passed by an AC signal; when the zero point is passed by the AC signal, the zero testing module outputs a zero point testing signal to the central processing unit, allowing the central processing unit to control the fan driver module and/or the light driver module according to the zero point testing signal; and a silicon controlled rectifier module, electrically connected to the central processing unit, further comprising:

a second optocoupler (MOC3021), having a first pin, a second pin, a fourth pin, and a sixth pin; wherein the second pin of the second optocoupler (MOC3021) is electrically connected to ground;

a third resistor (R39); wherein a side of the third resistor (R39) is electrically connected to the fire line, and another side of the third resistor (R39) is electrically connected to the sixth pin of the second optocoupler (MOC3021);

a fourth resistor (R42), electrically connected between the first pin of the second optocoupler (MOC3021) and the central processing unit;

a bidirectional triode thyristor (TRIAC), having a first pin, a second pin, and a third pin; wherein the first pin of the bidirectional triode thyristor is electrically connected to the zero line, the second pin of the bidirectional triode thyristor is electrically connected to the fire line and the third resistor (R39), and the third pin of the bidirectional triode thyristor is electrically connected to the fourth pin of the second optocoupler (MOC3021).

2. The highly integrated and smart control system as claimed in claim 1, wherein the control module further comprises:

a 2.4G radio frequency unit, electrically connected to the central processing unit; and a memory unit, electrically connected to the central processing unit;

wherein the control chip of the control module is packaged and integrated with the WiFi unit, the Bluetooth unit, the central processing unit in the control chip, the 2.4G radio frequency unit, and the memory unit;

wherein the highly integrated and smart control system further comprises:

an input module, communicatively connected to at least one of the WiFi unit, the Bluetooth unit, or the 2.4G radio frequency unit;

wherein the input module generates a wireless signal, and transmits the wireless signal to the at least one unit from the WiFi unit, the Bluetooth unit, or the 2.4G radio frequency unit;

wherein the central processing unit receives the wireless signal through the WiFi unit, the Bluetooth unit, or the 2.4G radio frequency unit;

wherein the central processing unit generates a working command according to the wireless signal, and transmits the working command to the fan driver module and/or the light driver module.

3. The highly integrated and smart control system as claimed in claim 2, wherein the input module comprises at least one of a communication terminal, a Bluetooth terminal, a remote control terminal, or a 2.4G terminal;

wherein the WiFi unit communicatively connects to the communication terminal through Internet, receives a WiFi wireless command signal outputted from the communication terminal, and outputs the WiFi wireless command signal to the central processing unit;

wherein the Bluetooth unit communicatively connects to the Bluetooth terminal or the remote control terminal, receives a Bluetooth wireless command signal outputted from the Bluetooth terminal or a remote control wireless command signal outputted from the remote control terminal, and outputs the Bluetooth wireless command signal or the remote control wireless command signal to the central processing unit;

wherein the 2.4G radio frequency unit communicatively connects to the 2.4G terminal, receives a 2.4G wireless command signal outputted from the 2.4G terminal or the remote control wireless command signal outputted from the remote control terminal, and outputs the 2.4G wireless command signal or the remote control wireless command signal to the central processing unit;

wherein the central processing unit receives the WiFi wireless command signal, the Bluetooth wireless command signal, the remote control wireless command signal, or the 2.4G wireless command signal, and outputs the working command to the fan driver module and/or the light driver module according to the WiFi wireless command signal, the Bluetooth wireless command signal, the remote control wireless command signal, or the 2.4G wireless command signal.

4. The highly integrated and smart control system as claimed in claim 3, wherein the WiFi unit, the Bluetooth unit, and the 2.4G radio frequency unit wirelessly communicate to other devices through a same antenna and through a same frequency band;

wherein the WiFi unit, the Bluetooth unit, and the 2.4G radio frequency unit use time-division multiplexing (TMD) for transmitting and receiving the WiFi wireless command signal, the Bluetooth wireless command signal, and the 2.4G wireless command signal.

5. The highly integrated and smart control system as claimed in claim 3, wherein when the Bluetooth unit communicatively connects the Bluetooth terminal, the Bluetooth unit outputs a first connection signal to the central processing unit; the central processing unit receives the first connection signal and outputs a first connection working command to the fan driver module and/or the light driver module according to the first connection signal; the fan driver module and/or the light driver module receives the first connection working command and functions according to the first connection working command and a default setting;

wherein when the Bluetooth unit communicatively disconnects the Bluetooth terminal, the Bluetooth unit outputs a second connection signal to the central processing unit; the central processing unit receives the second connection signal and outputs a second connection working command to the fan driver module and/or the light driver module according to the second connection signal; the fan driver module and/or the light driver module receives the second connection working command and functions according to the second connection working command and the default setting.

6. The highly integrated and smart control system as claimed in claim 3, wherein the communication terminal is a cloud server;

wherein when the WiFi unit receives local weather information sent from the communication terminal, the WiFi unit sends the local weather information to the central processing unit;

wherein when the central processing unit receives the local weather information from the WiFi unit, the central processing unit determines whether the local weather information is outside of a threshold range; if yes, the central processing unit generates an automatic working command and sends the automatic working command to the fan driver module and/or the light driver module; the fan driver module and/or the light driver module receives the automatic working command and functions according to the automatic working command.

7. The highly integrated and smart control system as claimed in claim 2, wherein the input module comprises a sensor unit and a press control unit; the sensor unit and the press control unit generate the wireless signal and output the wireless signal to the central processing unit;

wherein the highly integrated and smart control system also comprises at least one of a display module, a sanitization module, a cleansing module, or a music module; the display module, the sanitization module, the cleansing module, or the music module is connected to the central processing unit;

wherein the central processing unit outputs the working command to the display module, the sanitization module, the cleansing module, or the music module; the display module, the sanitization module, the cleansing module, or the music module receives the working command and functions according to the working command.

8. A control method for the highly integrated and smart control system as claimed in claim 2, the control method executed by the central processing unit and comprising the following steps:

receiving a wireless signal, generating a working command according to the wireless signal, and outputting the working command to the fan driver module and/or the light driver module for controlling the fan driver module and/or the light driver module.

9. The control method as claimed in claim 8, wherein the central processing unit receives the wireless signal which is generated and outputted by the input module;

wherein the wireless signal is at least one of a WiFi wireless command signal, a Bluetooth wireless command signal, a remote control wireless command signal, or a 2.4G wireless command signal.

10. The control method as claimed in claim 8, further comprising the following steps:

receiving a first connection signal from the Bluetooth unit when the Bluetooth unit is being connected with a Bluetooth terminal, and outputting a first connection working command to the fan driver module and/or the light driver module according to the first connection signal;

receiving a second connection signal from the Bluetooth unit when the Bluetooth unit is being disconnected from the Bluetooth terminal, and outputting a second connection working command to the fan driver module and/or the light driver module according to the second connection signal.

11. The control method as claimed in claim 8, further comprising the following steps:

receiving local weather information from the WiFi unit; wherein the WiFi unit obtains the local weather information from a communication terminal;

determining whether the local weather information is outside of a threshold range;

if yes, generating an automatic working command and sending the automatic working command to the fan driver module and/or the light driver module.

12. The control method as claimed in claim 8, further comprising the following steps:

receiving wireless command signals generated and sent from a sensor unit and a press control unit, generating the working commands according to the wireless command signals, and sending the working commands to a display module, a sanitization module, a cleansing module, or a music module for controlling the display module, the sanitization module, the cleansing module, or the music module.

13. A control method for the highly integrated and smart control system as claimed in claim 1, the control method executed by the central processing unit and comprising the following steps:

receiving a wireless signal, generating a working command according to the wireless signal, and outputting the working command to the fan driver module and/or the light driver module for controlling the fan driver module and/or the light driver module.

14. The control method as claimed in claim 13, further comprising the following steps:

receiving a first connection signal from the Bluetooth unit when the Bluetooth unit is being connected with a Bluetooth terminal, and outputting a first connection working command to the fan driver module and/or the light driver module according to the first connection signal;

receiving a second connection signal from the Bluetooth unit when the Bluetooth unit is being disconnected from the Bluetooth terminal, and outputting a second connection working command to the fan driver module and/or the light driver module according to the second connection signal.

15. The control method as claimed in claim 11, further comprising the following steps:

receiving local weather information from the WiFi unit; wherein the WiFi unit obtains the local weather information from a communication terminal;

determining whether the local weather information is outside of a threshold range;

if yes, generating an automatic working command and sending the automatic working command to the fan driver module and/or the light driver module.

16. The highly integrated and smart control system as claimed in claim 1, further comprising:

a hanging structure, connected to a ceiling and hanging from the ceiling;

a fan module, connected to the hanging structure, hanging from the ceiling via the hanging structure, and electrically connecting the fan driver module;

a light module, connected to the hanging structure, hanging from the ceiling via the hanging structure, and electrically connecting the light driver module;

a power module, electrically connected to the control module, the fan driver module, and the light driver module for providing power;

wherein the fan driver module and/or the light driver module receives the working command and functions according to the working command;

wherein the working command is a switch-on command or a switch-off command.

17. A control method for the highly integrated and smart control system as claimed in claim 16, the control method executed by the central processing unit and comprising the following steps:

receiving a wireless signal, generating a working command according to the wireless signal, and outputting the working command to the fan driver module and/or the light driver module for controlling the fan driver module and/or the light driver module.

18. The control method as claimed in claim 17, further comprising the following steps:

receiving a first connection signal from the Bluetooth unit when the Bluetooth unit is being connected with a Bluetooth terminal, and outputting a first connection working command to the fan driver module and/or the light driver module according to the first connection signal;

receiving a second connection signal from the Bluetooth unit when the Bluetooth unit is being disconnected from the Bluetooth terminal, and outputting a second connection working command to the fan driver module and/or the light driver module according to the second connection signal.

19. The control method as claimed in claim 17, further comprising the following steps:

receiving local weather information from the WiFi unit; wherein the WiFi unit obtains the local weather information from a communication terminal;

determining whether the local weather information is outside of a threshold range;

if yes, generating an automatic working command and sending the automatic working command to the fan driver module and/or the light driver module.

* * * * *